United States Patent
Li et al.

(10) Patent No.: US 12,164,516 B2
(45) Date of Patent: Dec. 10, 2024

(54) CLICK-TO-SCRIPT REFLECTION

(71) Applicant: Microsoft Technology Licensing, LLC, Redmond, WA (US)

(72) Inventors: Xiangnan Li, Gongzhuling (CN); Marc Todd Friedman, Seattle, WA (US); Wangchao Le, Redmond, WA (US); Evgueni Zabokritski, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/004,447

(22) PCT Filed: Jun. 25, 2021

(86) PCT No.: PCT/CN2021/102553
§ 371 (c)(1),
(2) Date: Jan. 5, 2023

(87) PCT Pub. No.: WO2022/267062
PCT Pub. Date: Dec. 29, 2022

(65) Prior Publication Data
US 2024/0126754 A1   Apr. 18, 2024

(51) Int. Cl.
*G06F 16/2453* (2019.01)
(52) U.S. Cl.
CPC .............................. *G06F 16/24542* (2019.01)
(58) Field of Classification Search
CPC ................................................ G06F 16/24542
See application file for complete search history.

(56) References Cited

U.S. PATENT DOCUMENTS

2017/0364539 A1* 12/2017 Jacob ................ G06F 16/24547
2019/0370481 A1* 12/2019 Jacob .................. G06F 21/6227
(Continued)

FOREIGN PATENT DOCUMENTS

| CN | 105426504 A | 3/2016 |
| CN | 106462484 A | 2/2017 |
| CN | 111400297 A | 7/2020 |

OTHER PUBLICATIONS

"International Search Report and Written Opinion Issued in PCT Application No. PCT/CN21/102553", Mailed Date: Mar. 23, 2022, 6 Pages.

*Primary Examiner* — Dangelino N Gortayo
(74) *Attorney, Agent, or Firm* — Barta Jones, PLLC

(57) ABSTRACT

A click-to-script service enables developers of big-data job scripts to quickly see the underlying script operations from optimized execution plans. Once a big-data job is received, the disclosed examples compile it and generate tokens that are associated with each operation of the big-data job. These tokens include may include the file name of the job, the line number of the operation, and/or an Abstract Syntax Tree (AST) node for the given operations. An original execution plan is optimized into an optimized execution plan, and the tokens for the original operations of the job script are assigned to the optimized operations of the optimized execution plan. The optimized execution plan is graphically displayed in an interactive manner such that users may view the optimized execution plan and click on its optimized operations to find the original operations of the job script.

20 Claims, 10 Drawing Sheets

(56) References Cited

U.S. PATENT DOCUMENTS

| | | |
|---|---|---|
| 2020/0201860 A1 | 6/2020 | Vogelsgesang et al. |
| 2021/0049167 A1* | 2/2021 | Brushaber ............ G06F 16/2455 |
| 2022/0269686 A1* | 8/2022 | Bordawekar ....... G06F 11/3409 |
| 2023/0127572 A1* | 4/2023 | Jacob .................. G06F 21/6227 |
| | | 707/755 |

* cited by examiner

```
// Output for @inputdata
OUTPUT AriaCooked
TO SSTREAM
"//localusers/wangrely/Quasar/Data/Cooked/Word/2021/05/23/UploadTime_2021_05_23-ClientTime_2021_05_23_2.ss"
#If("Outlooksystem" -- @PartitionName)
    HASH CLUSTERED BY EventInfo_Id
    Into 2500
        SORTED BY OfficeSession_Id, EventInfo_Name
#ELSE
    CLUSTERED BY EventInfo_Name, EventInfo_Id
    Into 2500
        SORTED BY OfficeSession_Id, EventInfo_Name
#ENDIF
WITH STREAMEXPIRY "366"
WHERE EventInfo_Time != NULL
AND EventInfo_Time.value.Date -- @Input
;
// Output for other
#If("True".Equals("False"))
```

FIG. 5B

CLICK-TO-SCRIPT REFLECTION

BACKGROUND

Structured Computations Optimized for Parallel Execution (SCOPE) is a high-level, declarative query language for big data. Like the common structured query language (SQL), SCOPE allows users to specify big-data jobs that interact with databases. Execution of a SCOPE job internally involves an execution plan being generated by SCOPE's query optimizer for the job script. For each job script, the optimizer generates a set of operations representing the steps for SCOPE runtime and job scheduler to produce the required results, which is known as a job plan. During cost-based optimization, a SCOPE optimizer transforms a job script into an equivalent but more efficient query by a sequence of substitutions, explorations and transformations. Despite their equivalency, the resulting plan may look quite different from the user script, e.g., after replicating and applying filters earlier and after removing redundancy in the script. Not surprisingly, these optimizations lead to challenges for users to comprehend, troubleshoot and hence interactively improve their SCOPE job scripts, leading to confusion and suboptimal user experiences.

From the platform side, SCOPE developers spend a substantial amount of time investigating question such as why SCOPE jobs are slow, why stages for the SCOP jobs are running for hours, etc. Most of the time, such issues may be addressed by editing and improving the scripts of the SCOPE job. For example, selected statements may be made more defensive to changes in data distributions or identify and rework a poorly implemented user defined function. A common step in troubleshooting is to find the blaming statements in a particular script that are responsible for a given issue. However, the transformations in the optimizer make it unintuitive to reverse-engineer from a SCOPE runtime stage to a script line.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects described herein are generally directed to a cloud-based service that enables developers of big-data job scripts to quickly see the underlying script operations from optimized execution plans. Once a big-data job is received, the disclosed examples compile it and generate tokens that are associated with each operation—or, at least, each operation—of the big-data job. These tokens include may include the file name of the job, the line number of the operation, and/or an Abstract Syntax Tree (AST) node for the given operations. An original execution plan for the job is created from the original job script. The original execution plan is optimized into an optimized execution plan. The tokens for the original operations of the job script are assigned to the optimized operations of the optimized execution plan. The optimized execution plan is graphically displayed to the developer such that the optimized operations of the optimized execution plan may be clicked, bringing the developer back to the original operations of the job script. In short, the job script is compiled, tokenized, and optimized, and its optimized version is displayed so that a user may click back to the original script operations.

BRIEF DESCRIPTION OF THE DRAWINGS

The present description will be better understood from the following detailed description read in light of the accompanying drawings, wherein:

FIGS. 5A-5C illustrate a user interface (UI) diagram depicting a big-data job script in a UI of a client computing device, according to some of the disclosed examples;

Corresponding reference characters indicate corresponding parts throughout the drawings.

DETAILED DESCRIPTION

Figure 1:
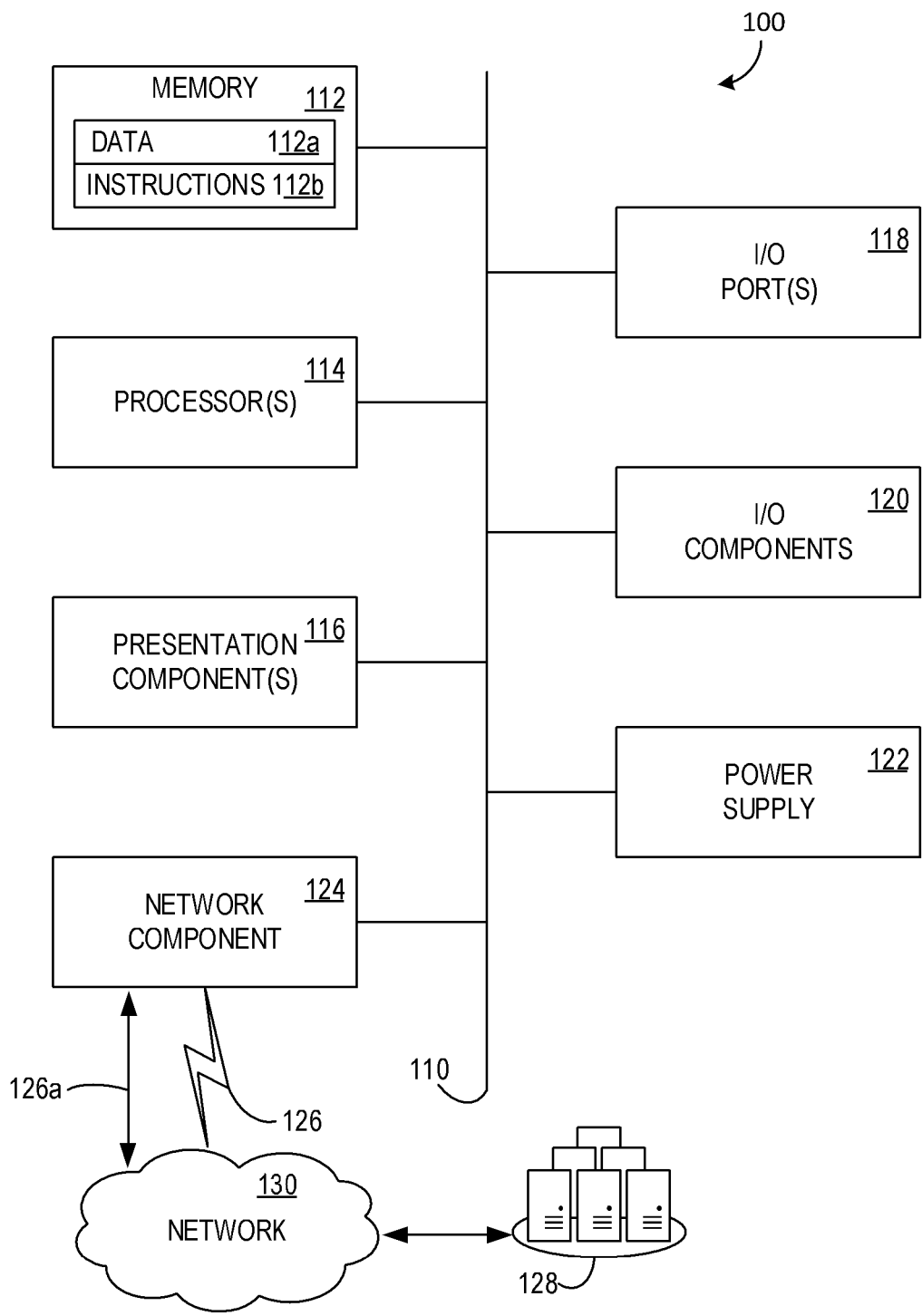
FIG. 1 is a block diagram illustrating an example computing device for implementing various examples of the present disclosure.

The various implementations, examples, and embodiments are described in detail with reference to the accompanying drawings. Wherever possible, the same reference numbers will be used throughout the drawings to refer to the same or like parts. References made throughout this disclosure relating to specific examples, implementations, and embodiments are provided solely for illustrative purposes but, unless indicated to the contrary, are not meant to limit all examples.

Developers of big-data jobs traditionally have little control on the optimization performed on their SCOPE, SQL, or other such jobs. This makes debugging quite difficult, because the developer is not able to easily identify which part of a job script is malfunctioning or underperforming from the optimized plan that is being actually executed. The implementations and examples disclosed herein track and allow developers to visually troubleshoot their big-data job scripts, allowing the developers to their pain points much faster than in conventional development environments.

To do so, a compiler front end applies a "token" to different operations of a job script. The token contains the file name of the job script, line number of the operation, and position of an Abstract Syntax Tree (AST) node. Collectively, this source information (file name of the job script, line number of the operation, and position of AST node) is plumbed through an optimizer and written it into execution plan artifacts. A visual studio (e.g., SCOPE Studio) provides a user interface (UI) to visualize a job execution graph, deserializing the source information as well as implementing a click-to-script feature that allows a developer to quickly jump to the specific script operations in the original job script. Through the UI, the developer is able to correctly and quickly navigate back to the line of script statement for further investigation of their job script.

The disclosed tokens are generated for each line and operation of a given job script of a big-data job. The big-data job is compiled and then optimized into an equivalent, and optimized, set of operations that are eventually scheduled and run on one or more clusters. The original tokens for the job's operations are migrated to the optimized operations, and the previously mentioned UI provides a user with the ability to interact with the optimized version of the job and click back to the original job script. For example, if operation A is assigned token A. Then, when operation A is combined with operation B to form optimized operation C, the token for operation A is associated with optimized operation C. When the user views operation C in the disclosed UI, the user is able to click back to the original operation A, which is incredibly useful from a debugging standpoint.

Any big-data jobs may use the disclosed implementations and examples. To aid the reference, the big-data jobs are referred to herein simply as "jobs." The jobs may include SCOPE jobs, SQL jobs, or any other type of job operating on data held in a relational database management system (RDBMS), stream processing, or the like.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, VMs, mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, California, open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, central processing unit (CPU), graphics processing unit (GPU), application-specific integrated circuit (ASIC), system on chip (SoC), or the like.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128, such as one or more of the cloud-computing environments depicted in the other drawings of this disclosure. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

Figure 2:
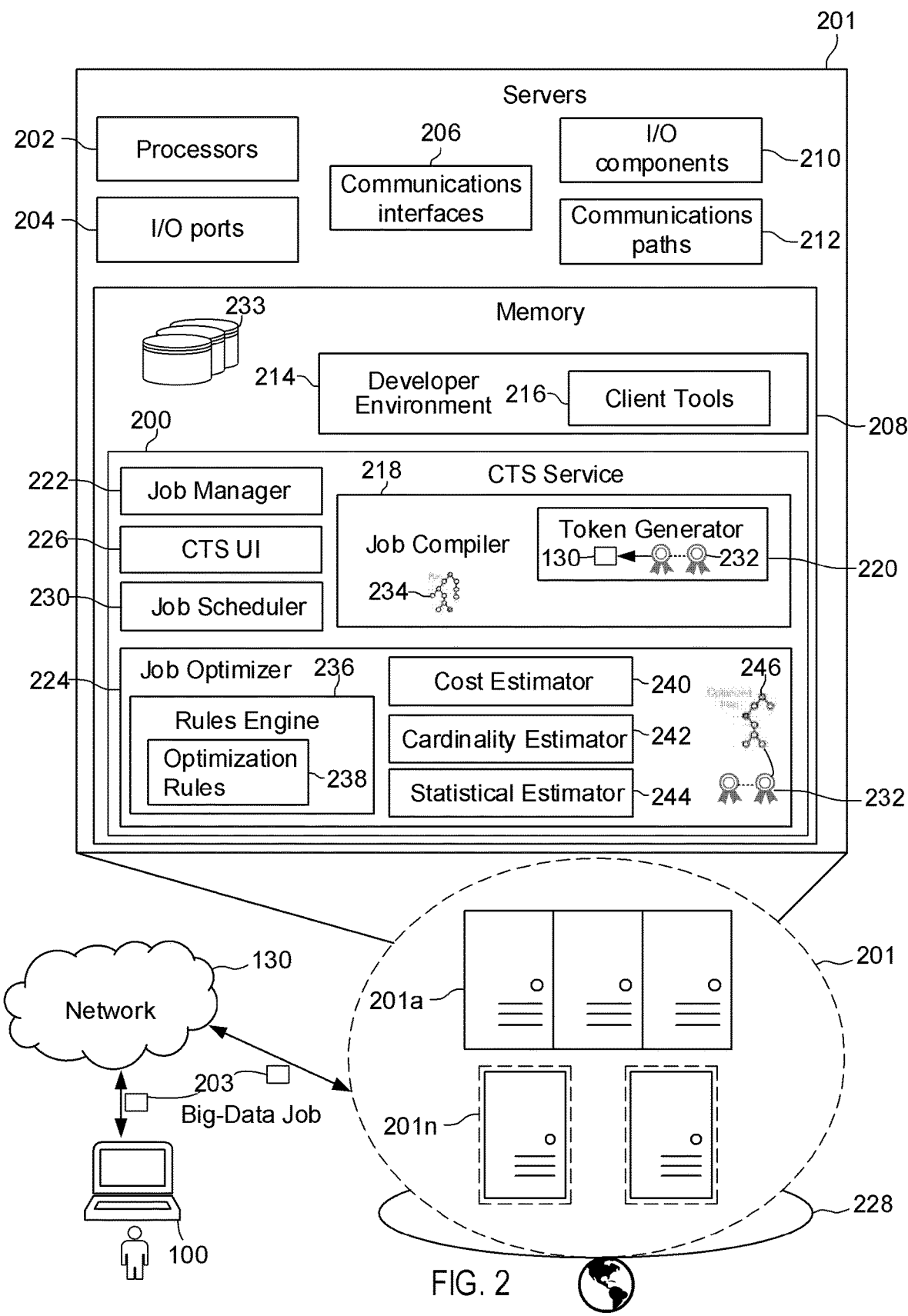
FIG. 2 illustrates a block diagram of a networking environment suitable for implementing a cloud service that tracks job script operations through compiling and optimization and allows a developer to quickly locate specific script operations using the disclosed implementations and examples.

FIG. 2 illustrates a block diagram of a networking environment suitable for implementing a cloud service (referred to as the "click-to-script" or "CTS" service) that tracks job script operations through compiling and optimization and allows a developer to quickly locate specific script operations using the disclosed implementations and examples. The networking environment involves a client computing device 200 communicating with a cloud environment 228 over a network 230. In reference to FIG. 1, client computing device 200 represents any number of computing devices 100, cloud environment 228 represents a cloud infrastructure similar to cloud environment 128 or 1000 (mentioned below in FIG. 10), and network 230 represents network 130. A developer is able to run (big-data) jobs 203 in the cloud environment 228. The job 203 comprises a script (e.g., written in SCOPE, SQL, or the like to be run in the cloud environment 228.

Cloud environment 228 includes various servers 201 that may be any type of server or remote computing device, either as a dedicated, relational, virtual, private, public, hybrid, or other cloud-based resource. As depicted, servers 201 include a mixture of physical servers 201a and virtual servers 201n, the latter of which are set up as VMs running inside of cloud environment 228. For the sake of clarity, these physical servers 201a and virtual servers 201n are collectively discussed as "servers 201," unless otherwise indicated. In some implementations and examples, the cloud environment 228 is operated as a large-scale cloud environment 128 (e.g., COSMOS developed by the MICROSOFT CORPORATION®), handling large amounts of data, such as an exabyte or more. Such implementations and examples may operate the various services 201 partially or wholly across the globe. In other words, the cloud environment 228.

Like computing device 100 mentioned above, servers 201 include or have access to one or more processors 202, I/O ports 204, communications interfaces 206, computer-storage memory 208, I/O components 210, and a communications path 212. Server topologies and processing resources are generally well known to those in the art, and need not be discussed at length herein, other than to say that any server configuration may be used to execute the tuning service referenced herein.

Memory 208 represents any quantity of computer-storage memory and memory devices that store executable instructions and data for automatically tuning operational parameters of the cloud environment 228. Among other things, memory 208 stores executable instructions for a developer environment 214 and a click-to-script (CTS) service 216, both of which may be implemented in software, firmware, hardware, or a combination thereof in various implementations and examples.

The developer environment 214 includes various client tools 216 for creating big-data jobs. For instance, the client tools may include a software development kit (SDK), application programming interfaces (APIs), and other coding used to create big-data jobs. In particular, the SCOPE SDK enables developers to create their SCOPE job scripts on the client computing device 100, and these SCOPE job scripts may be run in the cloud environment 228.

In operation, the developer creates a big-data job 203 (job 203) on the client computing device 100 using the client tools 216 of the developer environment 214. This job 203 may written in SCOPE, SQL, or other type of language. In particular, the job 203 comprises various lines of code that include different script operations. One skilled in the art will understand and appreciate that jobs 203 may be small or large, e.g., a few lines of code with only a handful of operations or thousands of lines of code with thousands of operations. In words, jobs 203 are quite diverse in their level of complexity, and the disclose implementations and examples used to track operations through optimization to execution may be used on any size job 203.

Additionally, one or more databases 233 store data for big-data jobs to run. These databases are shown as the big data database 214, and they may store any type of data, data stream, or the like. One skilled in the art will appreciate and understand that there is a virtually endless number of possibilities of different types of data that may be used and analyzed by big-data jobs.

The CTS service 200 provides a number of operations to compile the job 203, create an optimized plan for its execution, and schedule deployment. In some implementations and examples, the CTS service 200 includes a job compiler 218 with a token generator 220, a job manager 222, a job optimizer 224, a click-to-script (CTS) UI 226, and a job scheduler 230. The job compiler 218 complies the job 203. In addition compiling the job 203, or as part of it, the job compiler 218 creates an AST for the operations of the job 203. For example, if the job 203 includes three operations (operation 1, operation 2, and operation 3), the job compiler 218 compiles these operations into an original execution plan 234, generating machine-executable code for the job 203, and also creates an AST that maps the dependencies of the three operations—e.g., operation 3 may depend from operation 2, which depends from operation 2. The original execution plan 234 for the job 203 is then optimized for efficient execution in the cloud environment 228.

During generation of the original execution plan 234, the token generator 220 applies tokens 232 to the constituent operations of the job 203. In some examples, a token 232 is applied to each line of the job 203, thus resulting in numerous tokens being associated with the job 203. As mentioned above, each token 232 includes a file name of the job 203 script, line number of the operation to which the token 232 is applied, and position of an AST node for the particular operation. Collectively, this source information (file name of the job script, line number of the operation, and position of AST node) is plumbed through an optimizer and written it into execution plan artifacts. A visual studio (e.g., SCOPE Studio) provides a user interface (UI) to visualize a job execution graph, deserializing the source information as well as implementing a click-to-script feature that allows a developer to quickly jump to the specific script operations in the original job script. Through the UI, the developer is able to correctly and quickly navigate back to the line of script statement for further investigation of the original script of the job 203.

The job optimizer 224 applies various optimization rules to create an optimized execution plan 246 for the job 203. Typically, jobs 203 are written in SCOPE, SQL, or another declarative programming language. Abstractly, SCOPE and SQL code expresses what operations are to be performed but do not specify how the desired result should be achieved efficiently. The job optimizer 224 determines how to satisfy an operation request efficiently. For example, a SQL query may specify tables to join, what filters to apply, what grouping or aggregations to perform, etc., but may not specify in what order the joins are to be performed, what implementation algorithms should be used or what indexes should be used, etc. Yet, those decisions profoundly affect the runtime of SQL queries.

The job optimizer 224 includes executable instructions for a rules engine 236 with various optimization rules 238, a cost estimator 240, a cardinality estimator 242, and a statical estimator 244. These all may be implemented in software, firmware, and/or hardware. In particular, the rules engine 236 applies the various optimization rules 238 to the operations of the original plan 234 in order to streamline processing. While these optimization rules 238 are discussed in more detail below in reference to FIG. 3, the rules engine 236 implements the optimization rules 238 to generate candidate execution strategies in order to eventually create the optimized execution plan 246. More specifically, the optimization rules 238 include the following types of operations: simplification operations, logical exploration operations, and physical optimization operations.

The simplification operations simplify the operational tree of the original execution plan 234. This may include removal of contradictions and tautologies from the query tree. For example if the query contains "where T1.a>0 or T1.a<10," a filter is removed because any value of T1.a must satisfy the condition (assuming the column T1.a is not NULLable). If the query contains "where T1.a<0 and T1.a>10," then the entire subtree beneath the filter is removed from the query.

The logical expressions operations are applied to the query tree to generate different alternatives. For example if the query tree contains (T1 inner join T2) then (T2 inner join T1) will be generated as an alternative.

The physical optimization operations identifies and implements physical implementation alternatives. For example, if the query tree contains (T1 inner join T2) then (T1 inner hash join T2) and (T1 inner merge join T2) are likely to be among them.

In some examples, the rules engine 236 uses various classes to express the generic concept of tree-ness, and the detailed contents of a node in the tree are represented by a separate class: COpArg. COptExpr is the used class, representing a tree in isolation. CGroupExpr, on the other hand, represents a tree as part of a collection of trees stored in the memory 208. Both classes (COptExpr and GroupExpr) have a pointer to a COpArg argument for their contents and an array of children. The difference between the two is in how they represent their children. The children of a COptExpr are again COptExpr's. The children of a CGroupExpr are group numbers relative to the memory 208. That is, CMemo has a list of CGroup objects, a CGroup has a list of CGroupExpr objects, and each child of a CGroupExpr is an entire CGroup. Thus, a non-leaf CGroupExpr represents an entire family of trees, as the CGroupExpr varies in the child CGroup.

COpArg is an abstract class used to represent the details of a tree node. It has a great many derived classes, one for each type of operator. These derived classes are grouped together into families. The first dividing line is whether the operator represents an individual scalar value or an entire relation. For relational operators, a further division is made between logical and physical: physical operators represent specific algorithms, while logical operators are more declarative.

Each of these families are arranged in a sub-hierarchy of classes whose roots are immediate subclasses of COpArg: CScaOpArg, CLogOpArg, and CPhysOpArg. Additionally or alternatively, another subclass, CAncOpArg, is used to add scalar values to a relational tree.

Valrefs are not strictly speaking part of an operator tree. To understand how trees fit together it can be helpful to understand valrefs, and vice versa. In a relational tree, there are operators defining columns and other operators using them. For example, in the query "SELECT * FROM T WHERE T.x<5," the operator that reads the table T defines the column T.x and the operator that filters out rows uses T.x. Column names, such as Valrefs, are used to record this kind of connection between operators. Such column names (e.g., valrefs) are used to represent runtime constants, like parameters used in a query. Valrefs may be thought of as in terms of definition and use, but in this case, the "column" is defined by the execution environment instead of by an operator inside the original execution plan 234.

Examples of additional operators are provided below, without limitation:

CLogOp_Get reads a table. As a logical operator, it does not care which access method we use to read the table, if the entire table, or just seek particular rows. The details of the table are stored in a CTableMetadata object.

CPhyOp_Range reads a specific index. The Range will have a child operator giving the seek predicate.

CPhyOp_TableScan reads a table's base index (that is the heap or clustered index). It does not seek into the clustered index, nor does it take advantage of the clustered index's order.

CLogOp_Select and CPhyOp_Filter are the logical and physical operators for filtering rows. They have a relational child for the source of rows and a scalar child for the predicate.

CLogOp_Project and CPhyOp_ComputeScalar are the logical and physical operators for adding new columns to a relation. They have a relational child for the source of rows and a single anchor child listing the columns to add. This second child is always a CAncOp_PrjList. The project list has a variable number of CAncOp_PrjEl children. Each CAncOp_PrjEl has a CValRef member giving the name of the new column and a scalar child defining the new column.

CLogOp_BaseJoin is an abstract class for representing a logical join of two relations. It has subclasses for the different flavors of join: Inner joins get the simple name, CLogOp_Join; other join flavors (outer, semi, and antisemi) have more descriptive names (CLogOp_LeftOuterJoin, CLogOp_RightSemiJoin, and so on).

CPhyOp_HashJoin and CPhyOp_MergeJoin represent the hash- and sort-based join algorithms. These classes are used for all flavors of join (inner, outer, and so on).

CLogOp_Apply and CPhyOp_Apply are used for correlated joins—that is, joins where the inner side uses values from the outer side.

CLogOp_GbAgg represents a SQL GROUP BY clause. It has a relational child for the source of rows, a member list of valrefs for the columns to group by, and an anchor child for the list of aggregates to compute. Like CLogOp_Project, this anchor is a CAncOp_PrjList with zero or more CAncOp_PrjEl children.

CPhyOp_HashGbAgg and CPhyOp_StreamGbAgg represent the hash- and sort-based implementations of CLogOp_GbAgg.

CScaOp_Const represents a literal constant used in a scalar expression. The constant value is stored in a CXVariant.

CScaOp_Identifier represents a column reference in a scalar expression. The column is given by a valref. As mentioned above, this "column" may be a query parameter instead of a table column or value calculated in the query.

CScaOp_Comp represents a comparison predicate like "T.x<5." It has two children for the two values being compared and a CompareBMP member saying what the comparison should be.

CScaOp_Logical is used to combine multiple predicates. It has a variable number of child predicates and a member saying how to combine them (typically AND or, but there are some other rarely used options).

CPhyOp_Loops joins an uncorrelated nested loops join algorithm. represents an individual scalar value or an entire relation. For relational operators we make a further division between logical and physical: physical operators represent specific algorithms, while logical operators are more declarative.

The cost estimator 240 includes operations whose collective job is to evaluate candidate execution plans. Specifically, the cost estimator 240 costing operations compute estimated runtimes for physical operators of the original execution plan 234. For example, operators such as "Hash Join," "Sort," and "Index Scan" may be assigned specific cost scores indicative of the runtimes for their respective physical operations. Each physical operator performs a number of atomic operations such as "random input/output (I/O)" or "compare two values." The costing operations estimate how many times each atomic operation will be performed and multiplies that by a cost value for that atomic operation. Atomic operations are either CPU operations or I/O operations so each physical operator has a CPU cost and an I/O cost (which may be 0 depending on the operator and the circumstances).

The cardinality estimator 242 estimates how many rows will be produced by each operator in the query tree of the original execution plan 234. To produce estimates, the cardinality estimator 242 uses statistical informational on the data in the tables referenced by the query and constraint information on the data (e.g. uniqueness such as "customer id" is unique). Cardinality estimation is a dominant factor in query plan evaluation.

The statistical estimator 244 gathers statistical information required for cardinality estimation and costing and also for deciding when that information has fallen out of date due to modifications made to the original execution plan 234. This gathered statistical information about the job 203 or the data 224 the job 203 is analyzing in the database 233. This statistical information may include histograms, multi-column frequencies, string samples, average column widths, QO metadata, or the like.

In some examples, the entire schema of the database 233 is represented in metadata that is persisted on disk and cached in memory when the particular server 201 is running. The job optimizer 224 calls APIs (e.g., IMED interfaces) to build its own in-memory representation of the schema for the job 203. For each referenced table in the database 233, metadata is loaded for columns, indexes, uniqueness constraints, foreign key constraints, check constrains (e.g., x>0), triggers and other items of metadata. Some examples also, or alternatively, load metadata on indexed views of the data in the database 233.

Using the rules engine 236, the cost estimator 240, the cardinality estimator 242, and the statistical estimator 244, the job optimizer 224 generates the optimized execution plan 246. The tokens 232 of the original operators of job 203 are assigned, and perpetuated to, the equivalent operations in the optimized execution plan 246. For example, if operation 1 of the job 203 is optimized into operation A of the optimized execution plan 246, the token for operation 1 is assigned to operation A. Thus, tokens 232 are assigned to the resultant optimized operations of the optimized execution plan 246. The assignment of the tokens 232 to the operations of the optimized execution plan 246 provides a way to drill back to the original script of the job 203 after it runs.

The job scheduler 230 schedules the job 203 to run in the cloud environment 228. Jobs 203 may run on nodes, on clusters of nodes, within containers, or in another manner for executing cloud big-data jobs. The job scheduler 230 may provide VM creation for the job 203, operate load balancing to place the job where appropriate processing and memory resources are located, and/or perform a host of other functions for assigning the job 203 to be run on the database 233.

The job manager 222 runs and monitors the job 203 during execution. Once completed, the results of the job 203 may be returned to the developer through the CTS UI 226. In particular, the CTS UI 226 presents a graphical version of the optimized execution plan 246 with different optimized operations displayed and interactive such that the developer may click on those operations to see the specific operations of the original script for the job 203. This provides a click-to-script functionality, meaning the developer is able to simply click the optimized operation and be brought back to the operation of the original job 203 script that produced that optimized operation. The disclosed tokens 232 enable this ability to quickly navigate back to the original operations of the job 203 script after the job 203 has been compiled and optimized into the optimized execution plan 246. This allows the developer to quickly and easily see inspect their original code script.

In some examples, the optimization rules comprise several parts called "tasks." Tasks are objects that include a "perform" operation defined for them. Task objects offer significantly more flexibility than procedure invocations, in particular with respect to search algorithm and search control. A task object exists for each task that has yet to be done, and all such task objects are collected in a task structure. In some implementations and examples, the task structure is currently realized as a last-in-first-out stack (LIFO); however, other structures are alternatively used. The task objects may be reordered at any point, enabling very flexible mechanisms for heuristic guidance. Moreover, some implementations and examples represent the task structure by a graph that captures dependencies or the topological ordering among tasks and permit efficient parallel search (using shared memory). Using a restricted LIFO stack, scheduling a task is very similar to invoking a function, with the exception that any work to be done after a sub-task completes must be scheduled as a separate task.

Figure 3:
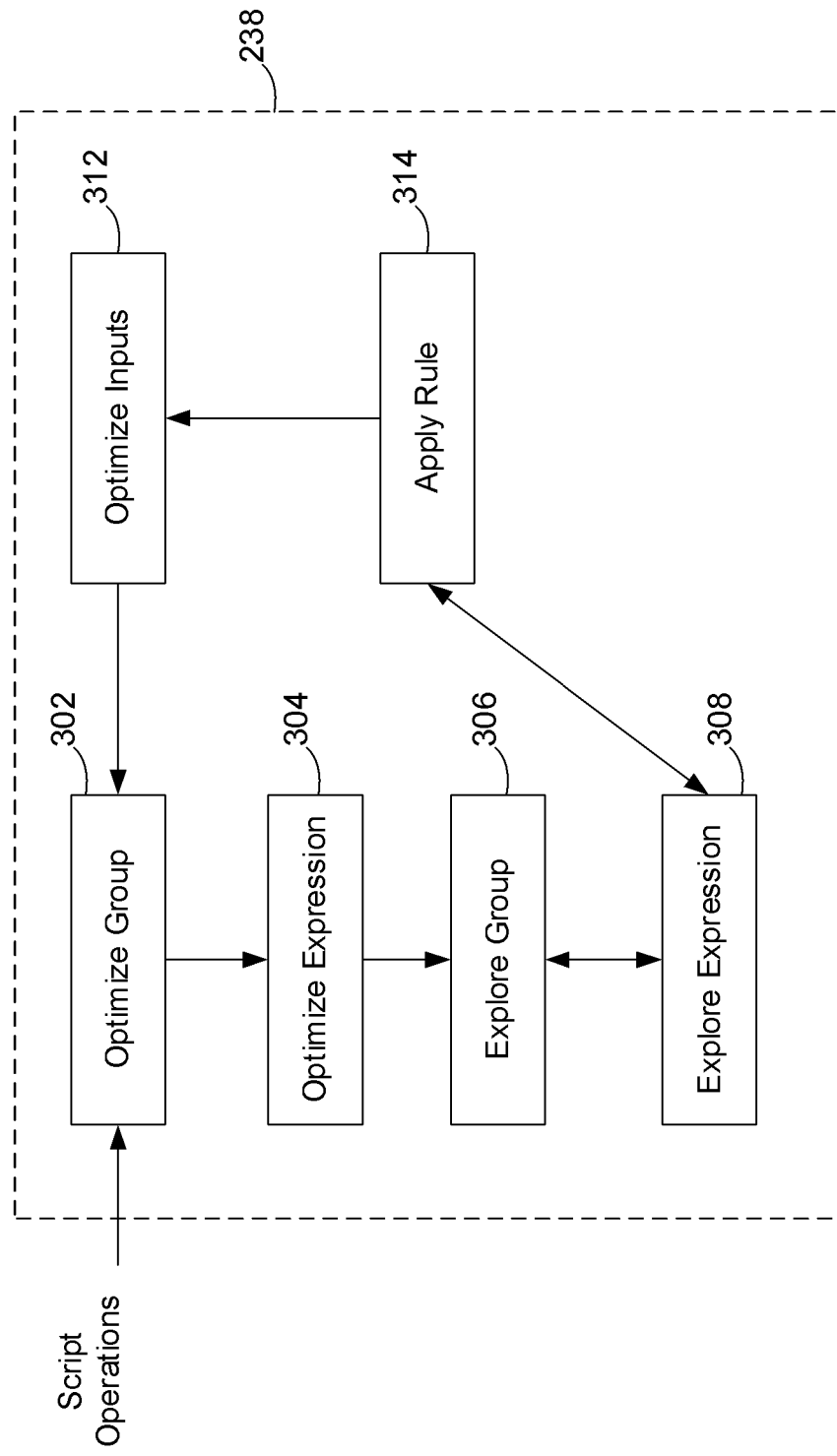
FIG. 3 illustrates a block diagram of one example of the optimization rules implemented by the optimization engine.

FIG. 3 illustrates a block diagram of one example of the optimization rules 238 implemented by the optimization engine 236. In general, the optimization rules 238 executed by the optimization engine 236 implement an equivalent operator tree that is efficient and economical in runtime for an input script. Such optimization breaks into tasks such as those tasks 302-312 shown in FIG. 3. In the disclosed example, the optimization rules 238 include: an optimize group task 302, a optimize expression task 304 an explore group task 306, an explore expression task 308, and optimize inputs task 310, and an apply rule task 312. The depicted arrows indicate which type of task 302-312 schedules (or invokes) other tasks 302-312. The optimization rules 238 first copy an original query into the internal "memo" structure and then trigger the entire optimization process with a task to optimize the class corresponding to the root node of the original query tree, which in turn triggers optimization of smaller and smaller subtrees. Eventually, the search converges to a point where no other equivalent operator tree is better. Usually, the output of optimization is very different from the user input and sometimes counter-intuitive. This invention in UI in part bridges the gap and makes it possible to map from output node to an input script line.

A task to optimize a group or an expression represents what was called an "optimization goal" in the Volcano optimizer generator, combining a group or expression with a cost limit and with required and excluded physical properties. Performing such a task results either in a plan or a failure. Optimizing a group means finding the best plan for any expression in the group and therefore applies rules to all expressions; whereas, optimizing an expression starts with a single expression. The former is realized by invoking the latter for each expression. The latter results in transitive rule applications and therefore, if the rule set is complete, finds the best plan within the starting expression's group. The distinction between the two task types is made purely for pragmatic reasons.

The optimization rules 238 implemented by the optimization engine 236 implement dynamic programming and memorization (storage). Before initiating optimization of all a group's expressions, the optimization engine 236 checks whether the same optimization goal has been pursued already. If so, it simply returns the plan found in the earlier search. Re-using plans derived earlier is the crucial aspect of dynamic programming and memorization. In the Volcano search strategy, a first operation applies all transformation rules to create all possible logical expressions for a query and all its subtrees. The second phase, which performs the actual optimization, navigates within that network of equivalence classes and expressions, applied implementation rules to obtain plans, and determined the best plan.

In the Cascades optimizer, this separation into two phases is abolished, because it is not useful to derive all logically equivalent forms of all expressions, e.g., of a predicate. A group is explored using transformation rules only on demand, and it is explored only to create all members of the group that match a given pattern. Thus, exploring a group or an expression (the distinction between these two mirrors the distinction between optimizing a group or an expression) means deriving all logical expressions that match a given pattern. The pattern, which is part of the task definition, is a subtree of the rule's antecedent or "before" pattern.

As do optimization tasks, exploration tasks also avoid duplicate work. Before exploring a group's expressions, the task to explore a group checks whether the same pattern has already been explored for the given group. If so, the task terminates immediately without spawning other tasks. Thus, the overall effort to expand logical expressions is also reduced by dynamic programming, i.e., retaining and reusing results of earlier search effort. The decision whether or not a pattern has already been explored is made using a "pattern memory" initialized and administered by the DBI of a database management system (DBMS).

For example, consider a join associativity rule. In Volcano, equivalence classes are expanded to contain all equivalent logical expressions before the actual optimization phase begins. Thus, during the optimization phase, when a join operator matches the top join operator in the rule, all join expressions for the rule's lower join are readily available so the rule can immediately applied with all possible bindings. In Cascades, these expressions are not immediately available and must be derived before the rule is applied. The exploration tasks provide this functionality. They are invoked not during a pre-optimization phase as in Volcano but on demand for a specific group and a specific pattern.

One might ask which of the Volcano technique and the Cascades technique is more efficient and more effective. The Volcano technique generates all equivalent logical expressions exhaustively in the first phase. Even if the actual optimization phase uses a greedy search algorithm, this first phase in Volcano must still be exhaustive. In the Cascades technique, this represents the worst case. If there is no guidance indicating which rule might lead to expressions matching the given pattern, exhaustive enumeration of all equivalent logical expressions cannot be avoided. On the other hand, if there is some guidance, some of that effort can be avoided, and the search strategy seems superior. On the other hand, the same group might have to be explored multiple times for different patterns. If so, redundant rule applications and derivations might occur. In order to avoid that, each expression in the "memo" structure includes a bit map that indicates which transformation rules have already been applied to it and thus should not be re-applied. Thus, we believe that the Cascades search strategy is more efficient because it explores groups only for truly useful patterns. In the worst case, i.e., without any guidance, the efficiency of the Cascades search will equal that of the Volcano search strategy.

On the other hand, if such guidance is incorrect, incorrect pruning of the search space may occur and the Cascades optimizer's effectiveness might suffer. Thus, it is very important that such guidance be correct. At least two techniques may be used.

First, by inspecting the entire rule set, in particular the top operators of each rule's antecedent ("before"-pattern) and consequent ("after"-pattern, substitute), the optimization rules 236 identify which operators can be mapped to which other operators in a single rule application. By taking the transitive closure of this reachability relationship, some rules are excluded from consideration. Note that this transitive closure can be computed when the optimizer is generated from the rule set, e.g, only once.

Applying a rule creates a new expression. Notice that the new expression can be complex (consisting of multiple operators, as in a join associativity rule) and may be either a transformation rule (creating a new logical expression) or an implementation rule (creating a new physical expression or plan). In fact, since an operator can be both logical and physical, one rule may be both a transformation and an implementation rule. Correct rule application for such rules is guaranteed.

Performing an "apply rule" task is fairly complex. It may roughly be broken into four components. First, all bindings for the rule's pattern are derived and iterated over one by one. Second, for each binding, the rule is used to create a new expression. Note that for function rules, there may be multiple new expressions for each binding. Third, the new expressions are integrated in the "memo" structure. Within this process, exact replicas of expressions that already exist in "memo" are identified and removed from further consideration. Fourth, each expression that is not a duplicate of an earlier one is optimized or explored with the same goal and context that triggered the current rule application. Let us discuss these four components in turn.

Since each rule's antecedent ("before"-pattern) may be complex, the Cascades optimizer employs a complex procedure to identify all possible bindings for a rule. This procedure is recursive, with each recursive invocation for each node in the pattern. Most of its complexity serves to obtain all possible bindings for a rule's pattern. In fact, the procedure is realized as an iterator that produces the next feasible binding with each invocation. The state of this iteration is captured in the "BINDING" class with one instance of that class for each node in the pattern.

Once a binding is found, it is translated into a tree consisting of "EXPR" nodes (note that this class is part of the DBI interface, whereas the optimizer's internal data structures are not). This copy step represents some effort, but it isolates the optimizer from the DBI methods that may be invoked for this tree. For each binding, the rule's condition function is invoked and qualifying bindings are then translated into the rule's consequent ("after"-pattern, substitute). For some rules, this is very easy and entirely left to the optimizer. For other rules, the DBI specified a function to create the substitute, and this function is invoked repeatedly to create as many substitute as possible. In other words, this function may be an iterator producing multiple substitutes in consecutive invocations. Thus, the effort of extracting a binding from the "memo" is leveraged for multiple transformations if possible.

Thus, the optimization rules 238 end up calling the rules to generate various expressions. In some examples, three specific rules are used: substitution rules, exploration rules, and implementation rules. The substitution rules generate a new logical expression and delete original expressions of the job 203 on which they fire. Exploration rules generate a new logical expression from an original input, with the new expression and the input will be rooted in the same group. And the implementation rules generate a physical alternative to a logical expression.

Figure 4:
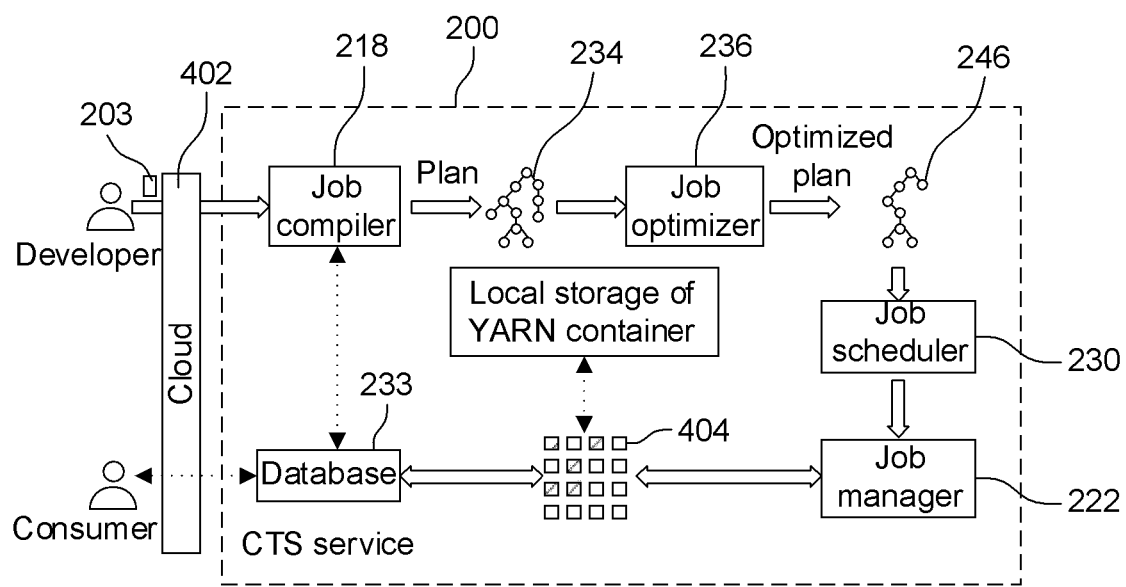
FIG. 4 illustrates a flow diagram of a networking environment suitable for implementing a cloud service that tracks job script operations through compiling and optimization and allows a developer to quickly locate specific script operations using the disclosed implementations and examples.

FIG. 4 illustrates a flow diagram of a networking environment suitable for implementing the CTS service 200 to track job script operations through compiling and optimization and allow a developer to quickly locate specific script operations using the disclosed implementations and examples. In operation, the developer submits the job 203 comprising its job script to a cloud front end 402, which may be the previously discussed developer environment 214. The job compiler 218 compiles the job 203 and creates an original execution plan 234 based on the actual operations of the job 203. The job compiler also applies the previously discussed tokens to each line of the script of the job 203. The job optimizer 236 creates an optimized execution plan 246 for the job 203, using the previously discussed optimization rules 238 executed by the rules engine 236.

The job scheduler 230 schedules the cloud resources for the optimized execution plan 246 of the job 203 to run, and the job manager 232 allocates the resources and runs in the job 203 accordingly. In some examples, the job manager 232 schedules the optimized execution plan 246 of the job 203 to run on one or more containers (e.g., YARN containers) in the cloud environment 228. The job 203 runs the job in the containers, accessing data in the database 233. And a consumer of the job 203 may access the results of the job 203 through cloud front end.

Figure 5A:
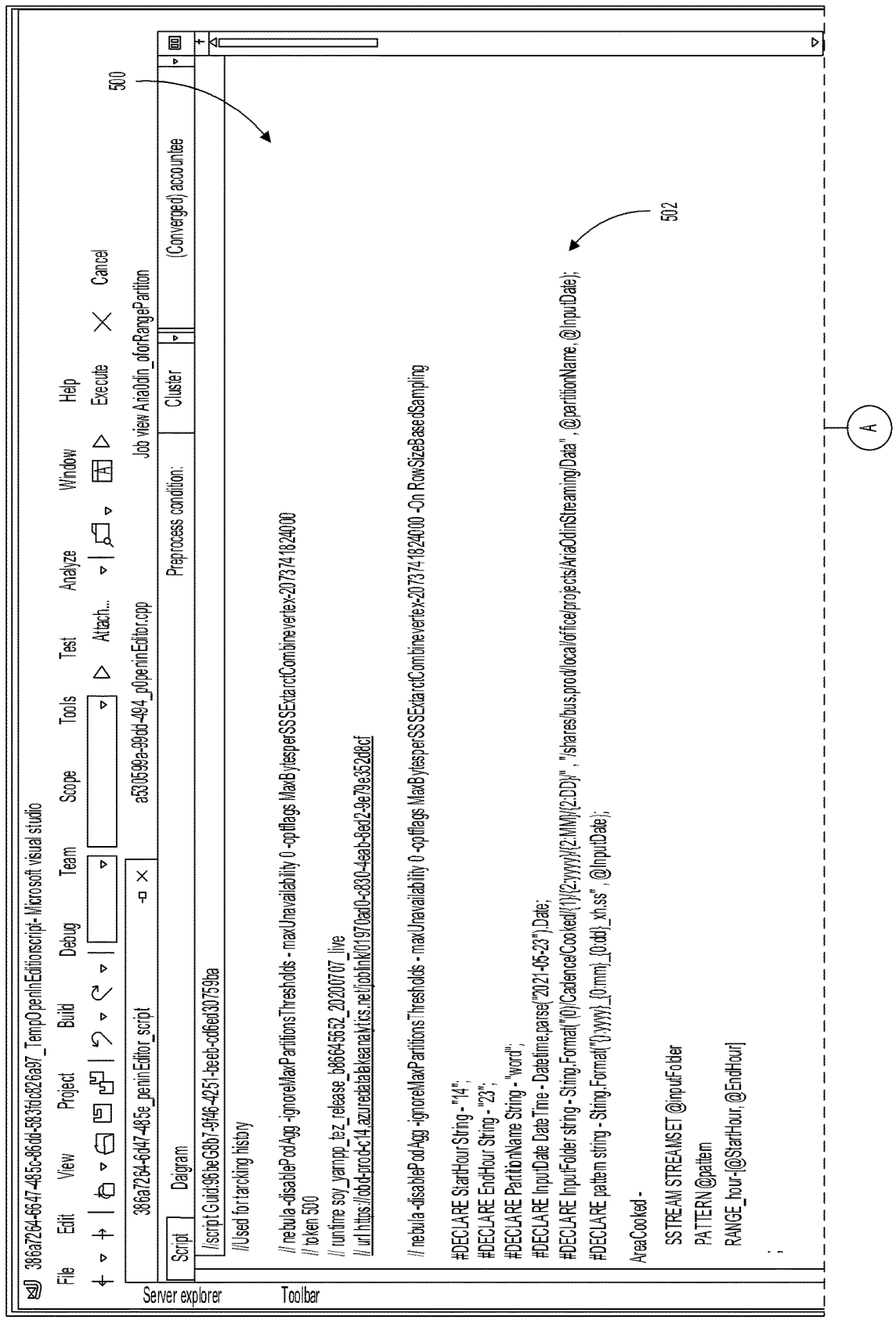
Figure 5C:
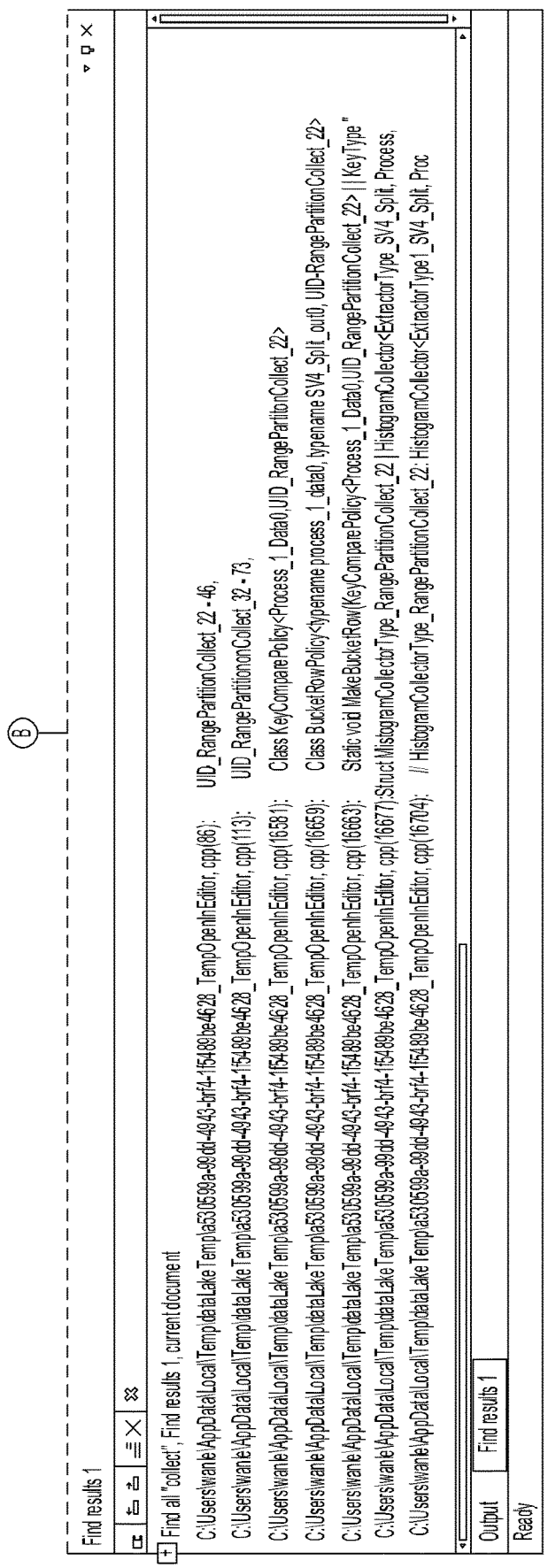

FIGS. 5A-5C illustrate a single UI diagram depicting a big-data job script 502 in a first UI window 500 of a client computing device 100, according to some of the disclosed examples. A developer has written the job script 502 and is able to submit it for execution to the clout environment 228. The depicted job script 502 was created in SCOPE using the previously discussed client tools 216 of the developer environment 214 that are exposed to client computing devices 100. These client tools 216 include the illustrated client-side development application where the developer is able to create the shown job script 502. As previously discussed, the job script 502 is compiled and optimized into an optimized execution plan.

Figure 6:
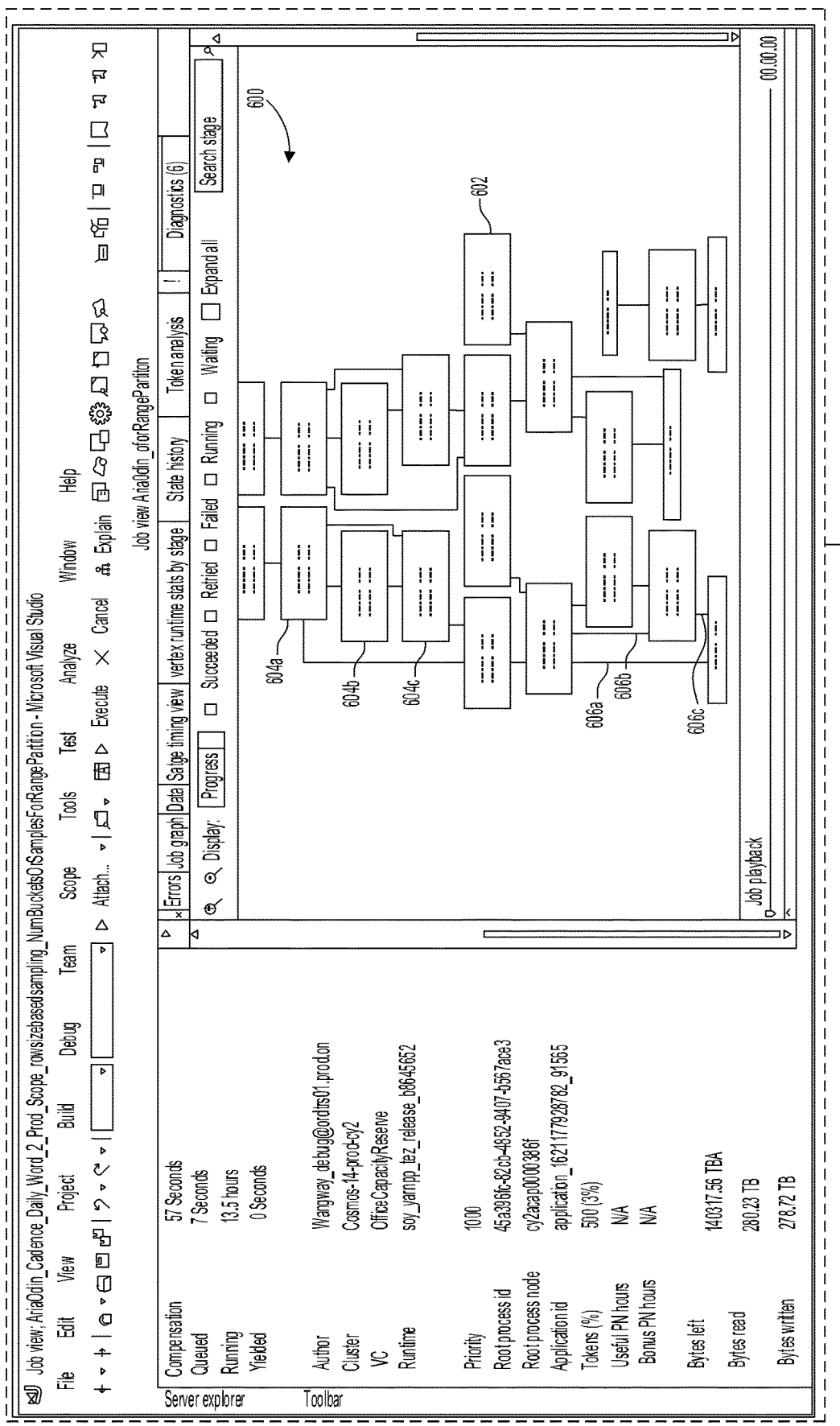
FIG. 6 illustrates a UI diagram depicting a second UI window illustrating an Abstract Syntax Tree (AST) of an optimized execution plan for the big-data job script, according to some of the disclosed examples.
Figure 6:
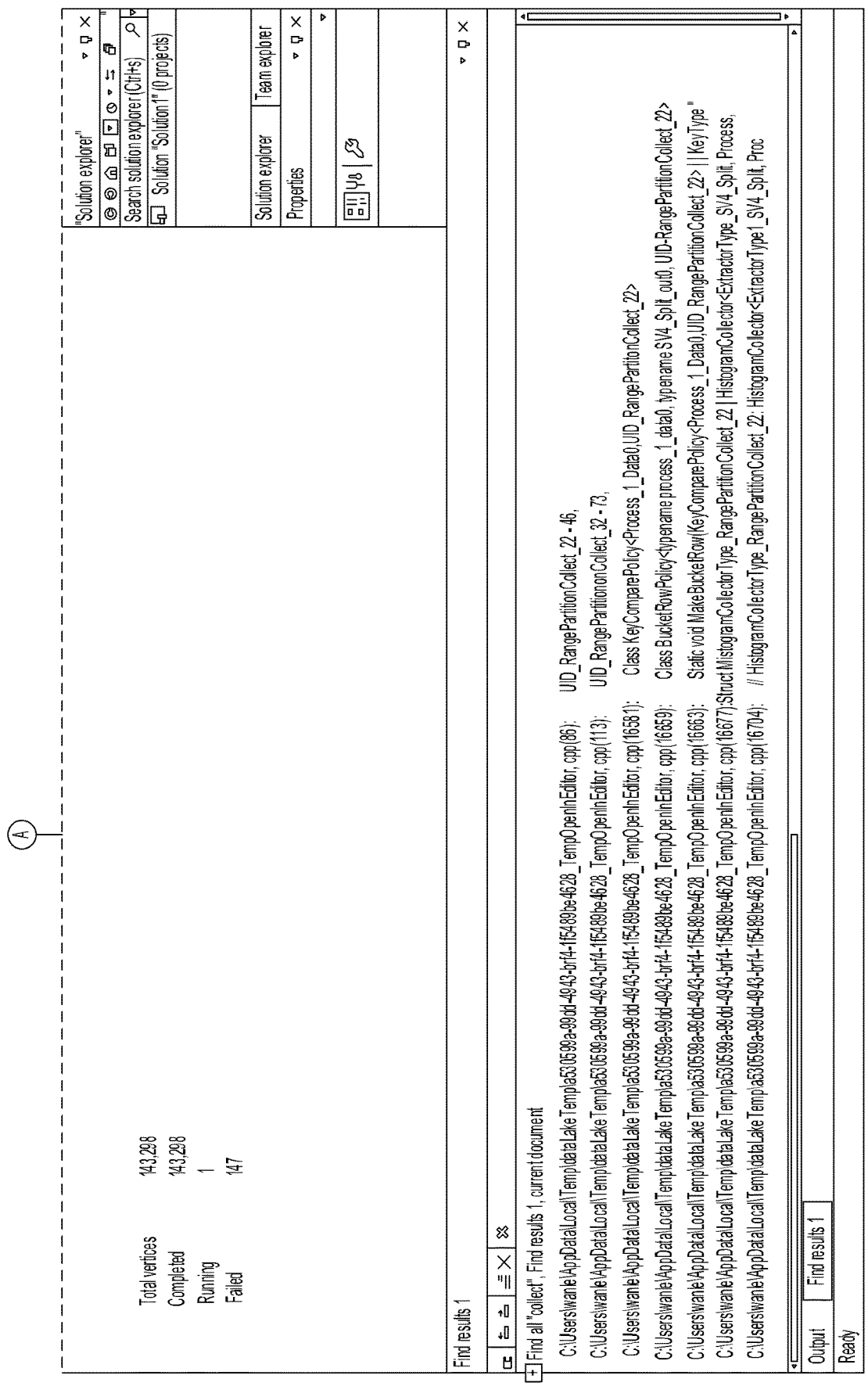

FIG. 6 illustrates a UI diagram depicting a second UI window 600 illustrating an AST 602 of the optimized execution plan 246 for the job script 402, according to some of the disclosed examples. The AST 602 presents the operations of the optimized execution plan for the job script 502—which may, in fact, differ from the actual operations of the job script 502—to the developer in the form of interdependent tree leaves 504a-c (only three of which are numbered for clarity). The tree leaves 604 are interactive, meaning the developer is able to click on them and be brought to the underlying script operations that they include. For example, leaf 504c illustrates an Aggregate operation, and clicking leaf 504c brings up the corresponding code for that Aggregate operation. Correlation of the optimized operations shown in the AST of the optimized execution plan 246 to the actual operations of the job script 502 is performed using the previously discussed tokens. Additionally, as shown, the interdependencies of the various leaves 504 are visually shown. For example, connectors 606a-c highlight three interdependencies.

Figure 7:
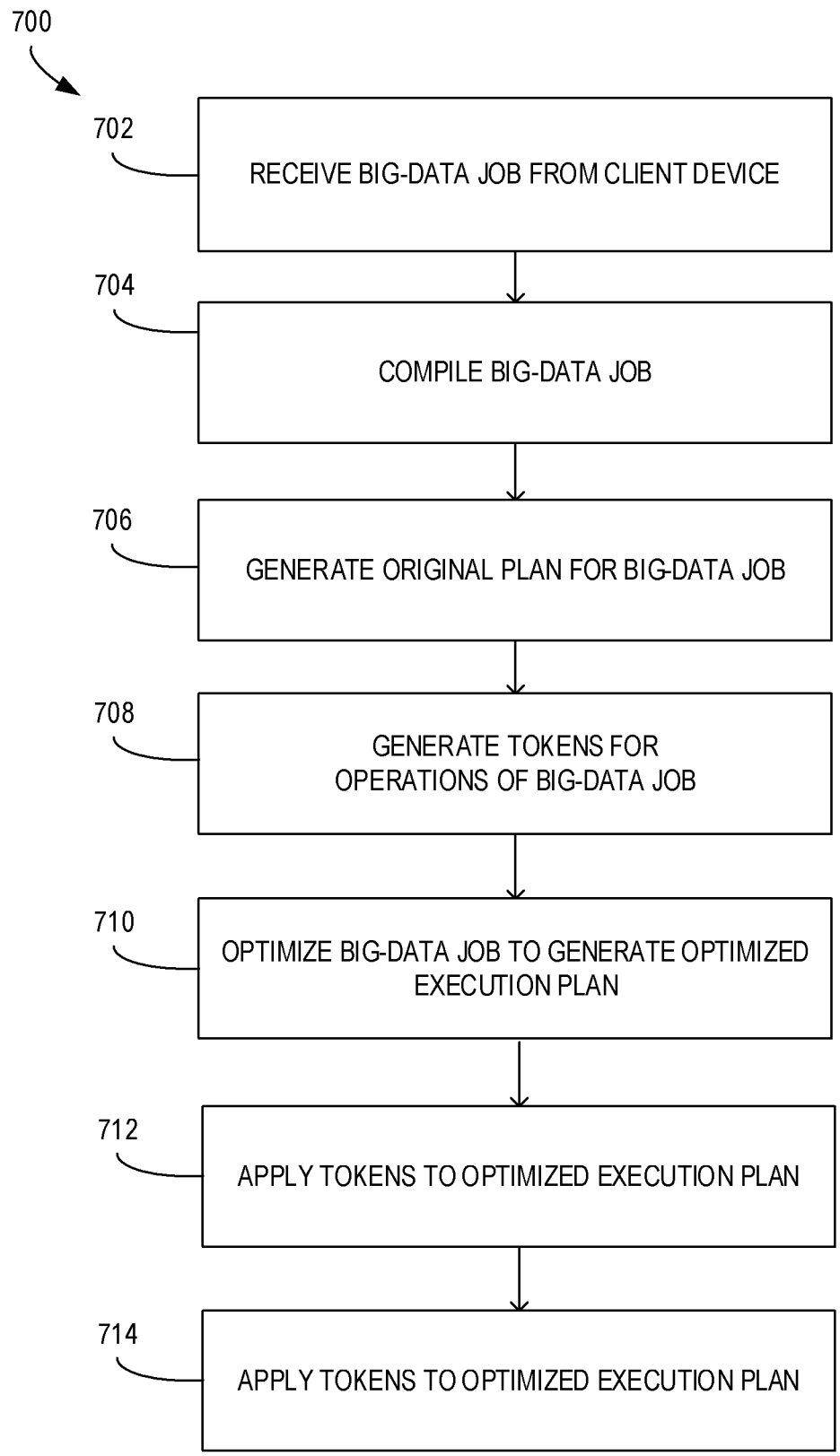
FIG. 7 illustrates a flowchart diagrams depicting operational flows for implementing a cloud service that tracks job script operations for a big-data job through optimization into an optimized execution plan of the big-data job comprising at least one different operation than the job script operations, according to some of the disclosed examples.

FIG. 7 illustrates a flowchart diagram depicting an operational flow 700 for implementing a cloud service that tracks job script operations for a big-data job through optimization into an optimized execution plan of the big-data job comprising at least one different operation than the job script operations. A big-data job is received from a client computing device, as shown at 702. The big-data job is compiled, as shown at 704. And tokens are generated for each of the operations in the script of the big-data job, as shown at 706. The tokens may include any combination of a file name of the job script, line numbers of the job script operations, and/or an AST node of the big-data job.

The big job script operations of the big-data job are optimized to create the optimized execution plan of the big-data job, as shown at 710. The tokens of the original job script operations of the original execution plan are associated with the job script operations of the optimized execution plan, as shown at 712. And a graphical representation is presented to a user that shows the job script operations of the optimized execution plan, as shown at 714. The use may then click on different tiles, leaves, or other UI windows depicting the optimized job script operations of the optimized execution path and be brought back to the original job script operations of the big-data job. The associated tokens provide this link between the original and the optimized script operations of the big-data job.

The method comprises: applying tokens to the job script operations during compiling of the big-data job, wherein the tokens comprise a file name of the job script and line numbers of the job script operations of the big-data job; optimizing the job script operations to create the optimized execution plan of the big-data job; associating at least one of the tokens applied to one of the job script operations with the at least one different operation of the optimized execution plan; and providing a graphical representation of the at least one different operation to a user that allows the user to click back to said one of the job script operations.

Additional Examples

Some examples are directed a method for implementing a cloud service that tracks job script operations for a big-data job through optimization into an optimized execution plan of the big-data job comprising at least one different operation than the job script operations. The method comprises: applying tokens to the job script operations during compiling of the big-data job, wherein the tokens comprise a file name of the job script and line numbers of the job script operations of the big-data job; optimizing the job script operations to create the optimized execution plan of the big-data job; associating at least one of the tokens applied to one of the job script operations with the at least one different operation of the optimized execution plan; and providing a graphical representation of the at least one different operation to a user that allows the user to click back to said one of the job script operations.

Other examples are directed to a method for implementing a cloud service that tracks job script operations for a big-data job through optimization into an optimized execution plan of the big-data job comprising at least one different operation than the job script operations. The method comprises: applying tokens to the job script operations during compiling of the big-data job, wherein the tokens comprise line numbers of the job script operations and positions of an AST node for an original plan of the big-data job; optimizing the job script operations to create the optimized execution plan of the big-data job; associating at least one of the tokens applied to one of the job script operations with the at least one different operation of the optimized execution plan; and providing a graphical representation of the at least one different operation to a user that allows the user to click back to said one of the job script operations.

Still over examples are directed to a system for implementing a cloud service that tracks job script operations for a big-data job through optimization into an optimized execution plan of the big-data job comprising at least one different operation than the job script operations. The system comprises: memory embodied with instructions to compile and add tokens to the job script operations of the big-data job and optimize the job script with the added tokens into an optimized execution plan; and one or more processors configured to: apply the tokens to the job script operations during compiling of the big-data job, wherein the tokens comprise line numbers of the job script operations of the big-data job; optimize the job script operations to create the optimized execution plan of the big-data job; associate at least one of the tokens applied to one of the job script operations with the at least one different operation of the optimized execution plan; and provide a graphical representation of the at least one different operation to a client computing device.

Alternatively, or in addition to the other examples described herein, examples include any combination of the following:

optimizing the big-data job into the optimized execution plan through combining at least two of the job script operations into an optimized operation of the optimized execution plan;

optimizing the big-data job into the optimized execution plan through generating a tree of optimized operations for the optimized execution plan;
wherein generation of the tree comprises, at least in part, expressing either a COptExpr or a GroupExpr class of tree;
wherein the tokens additionally include an Abstract Syntax Tree (AST) of the original plan of the big-data job;
running the optimized execution plan of the big-data job in one or more containers of a cloud environment;
wherein the one or more containers comprise a YARN container;
wherein the cloud environment comprises one or more virtual machines running the one or more containers;
wherein the big-data job is a SCOPE job;
wherein the big-data job is a SQL job;
wherein the graphical representation comprises interactive tree leaves comprising the at least one different operation that a user is able to click to view at least one of the job script operations associated with the at least one different operation; and
wherein the at least one different operation is generated through usage of a COpArg abstract class representing tree node details.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for tracking a job script operation, the method comprising:
    applying a token to each line of the job script operation for a job during compiling of the job, wherein the token comprises a file name of the job script and a line number of the job script operation of the job to which the token is applied;
    optimizing the job script operation to create an optimized execution plan of the job, wherein the optimized execution plan comprises a different operation than the job script operation;
    associating a token applied to a job script operation with the different operation of the optimized execution plan; and
    providing a graphical representation of the operation in a user interface that allows a user to navigate back to the job script operation.

2. The method of claim 1, further comprising optimizing the job into the optimized execution plan through combining at least two job script operations into an optimized operation of the optimized execution plan.

3. The method of claim 1, further comprising optimizing the job into the optimized execution plan through generating a tree of optimized operations for the optimized execution plan.

4. The method of claim 3, wherein generation of the tree comprises expressing either a COptExpr or a GroupExpr class of tree.

5. The method of claim 1, wherein the token additionally includes an Abstract Syntax Tree (AST) of an original plan of the job.

6. The method of claim 1, further comprising running the optimized execution plan of the job in a container of a cloud environment.

7. The method of claim 6, wherein the container comprises a Yet Another Resource Negotiator (YARN) container.

8. The method of claim 6, wherein the cloud environment comprises a virtual machine running the container.

9. The method of claim 1, wherein the job is a Structured Computations Optimize for Parallel Execution (SCOPE) job.

10. The method of claim 1, wherein the job is a Structured Query Language (SQL) job.

11. A method for tracking a job script operation, the method comprising:
    applying a token to each line of the job script operation for a job during compiling of the job, wherein the token comprises a line number of the job script operation to which the token is applied and positions of an Abstract Syntax Tree (AST) node for an original plan of the job;
    optimizing the job script operation to create an optimized execution plan of the job, wherein the optimized execution plan comprises a different operation than the job script operation;
    associating a token applied to a job script operation with the different operation of the optimized execution plan; and
    providing a graphical representation of the operation in a user interface that allows a user to navigate back to the job script operation.

12. The method of claim 11, further comprising optimizing the job into the optimized execution plan through combining at least two job script operations into an optimized operation of the optimized execution plan.

13. The method of claim 11, further comprising optimizing the job into the optimized execution plan through generating a tree of optimized operations for the optimized execution plan.

14. The method of claim 11, wherein the graphical representation comprises interactive tree leaves comprising the different operation that a user is able to navigate to view the job script operation associated with the different operation.

15. The method of claim 11, wherein the different operation is generated through usage of a COpArg abstract class representing tree node details.

16. A system for tracking a job script operation, the system comprising:
    memory embodied with instructions to compile and add a token to a job script operation of a job and optimize the job script operations with the added token into an optimized execution plan; and
    a processor configured to:
        apply the token to each line of the job script operation for a job during compiling of the job, wherein the token comprises a line number of the job script operation of the job to which the token is applied;
        optimize the job script operation to create the optimized execution plan of the job, wherein the optimized execution plan comprises a different operation than the job script operation;
        associate a token applied to a job script operation with the different operation of the optimized execution plan; and
        provide a graphical representation of the different operation to a client computing device.

17. The system of claim 16, wherein said optimizing the job into the optimized execution plan comprises combining at least two job script operations into an optimized operation of the optimized execution plan.

18. The system of claim 16, wherein said optimizing the job into the optimized execution plan comprises generating a tree of optimized operations for the optimized execution plan.

19. The system of claim 16, wherein the job is a Structured Computations Optimize for Parallel Execution (SCOPE) job.

20. The system of claim 16, wherein the job is a Structured Query Language (SQL) job.

* * * * *